June 3, 1924.
H. I. MORRIS
TIRE CARCASS
Original Filed Aug. 14, 1918    2 Sheets-Sheet 1
1,496,164
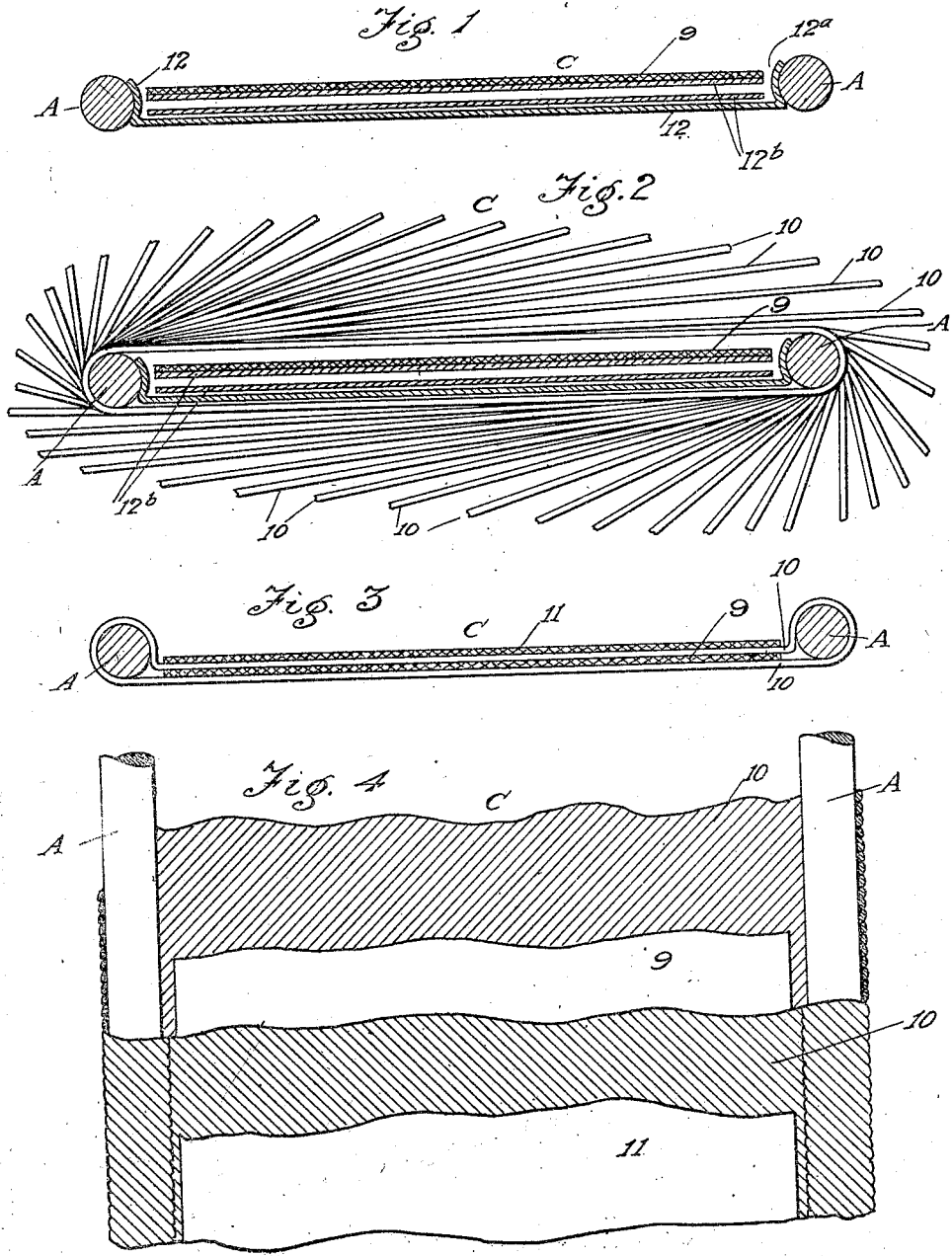

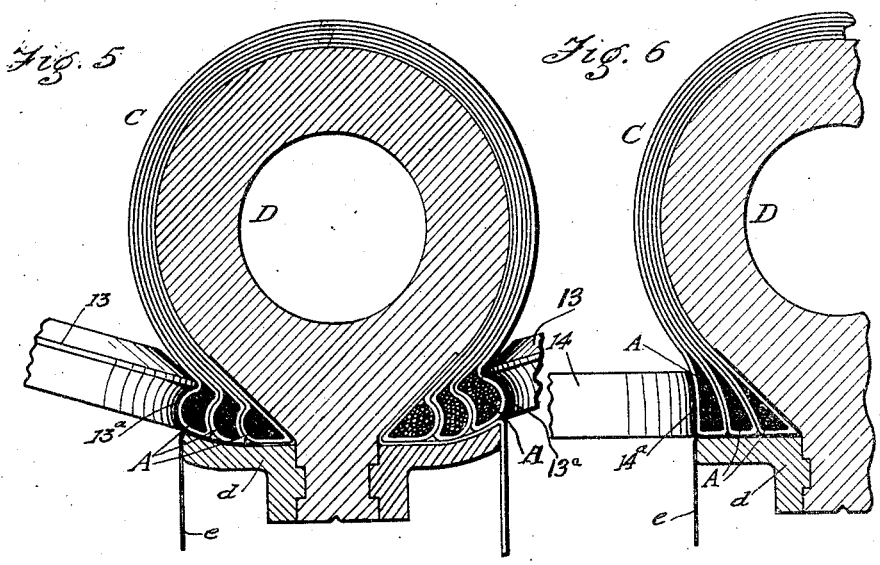
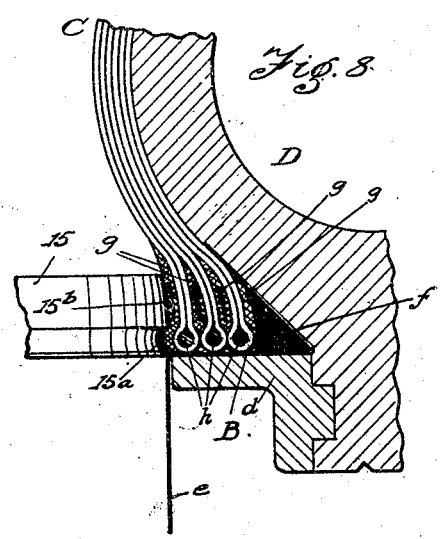
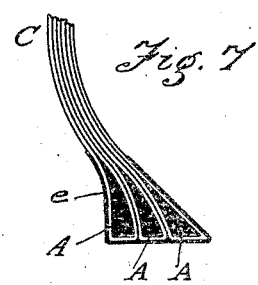
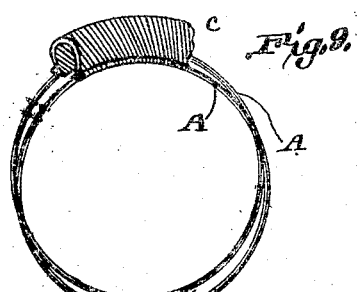

Patented June 3, 1924.

1,496,164

UNITED STATES PATENT OFFICE.

HOWARD I. MORRIS, OF LOS ANGELES, CALIFORNIA, ASSIGNOR TO THE CORD TIRE MACHINE COMPANY, OF CLEVELAND, OHIO, A CORPORATION OF ARIZONA.

TIRE CARCASS.

Application filed August 14, 1918, Serial No. 249,874. Renewed April 30, 1923.

*To all whom it may concern:*

Be it known that I, HOWARD I. MORRIS, a citizen of the United States, residing at Los Angeles, in the county of Los Angeles and State of California, have invented new and useful Improvements in Tire Carcasses, of which the following is a specification.

This invention relates to tires and tire beads and materials for same, being with respect to the fabric for tires and tire beads, such a product or article of manufacture, in various forms and organizations, as is capable of manufacture in the use of material and tire-making machines for which I have applied for Letters Patent of the United States in an application executed by me August 1st, 1918, preparatory to filing the same in the United States Patent Office.

The present invention contemplates a product composite of spaced tire bead elements and windings or wrappings of tire body material, such as textile strands, cords or threads, and by preference one or more sheets or strips or layers or courses of further tire material, such as rubber or rubber-impregnated textile material. Where one of said sheets or strips of further tire material is employed, the windings or wrappings may be applied to and over it and preferably around or about the tire bead elements, so as to enclose or envelope such further sheet or strip of tire material. These elements are preferably consolidated or pressed together between the parallel tire bead elements, which are provided at the sides of the tire body material, and the second or further tire material strip or sheet is consolidated with such elements and overlying one course or layer of the windings or wrappings, and between the tire bead elements at the sides or edge portions of the material. A product so produced may readily be formed into a tire or tire carcass, in the manner set forth in said application hereinabove identified, by feeding or supplying such tire material and bead material to a suitable core, and forming the tire upon the core, in successive laps or courses, as the tire and tire bead material is fed thereto the tire thus being built up progressively and suitably rolled down and pressed into final form, together with its bead elements at its sides.

It will be seen that the invention concerns, as to the tire and tire bead fabric side thereof, a strong, durable, and readily worked or fabricated and conveniently utilized material or fabric, which may be of the "cord" type, having both bead elements and tire body elements, and from which tire bodies and tire beads may readily be produced and organized. Upon its other side, the invention relates to tires and tire beads capable of convenient, speedy and thoroughly satisfactory production from or by the utilization or employment of the tire and tire bead fabric or modifications thereof, which likewise are included within the scope and substance of the present invention. And that also, upon the tire and tire bead side the invention relates to further structural adjuncts and features, of high advantage, as will be appreciated, with all the other aspects and features of the invention, by those skilled in the art, and including such factors or integers as the bead jacket or envelope or cover members, and the interlocking strips, and the filler material, which, together with the other bead elements or courses thereof is confined within such jacket or envelope. It will be understood that the tire and bead features of the present invention are not limited to the employment of the exact tire and bead fabric, which is hereinafter disclosed, nor are the tire and bead fabric features of the invention to be limited to tires and beads of the exact organization herein disclosed. However, the tire and bead fabric features of the invention may well be utilized in constructing and producing tires and beads within the scope and substance of the present invention.

Other objects of the invention will be obvious to those skilled in the art to which my invention relates taken in connection with the following description and accompanying drawings.

In the drawings:

Figure 1 is a fragmentary cross sectional view illustrating a platen in connection with which certain steps in the production of the tire and bead fabric may effectively be taken, tire bead members or elements being shown disposed at the sides thereof, and a tire body element, together with a spacer sheet or strip which serves as a carrier or conveyer for said further tire body material, the latter being shown above the platen;

Figure 2 is a view similar to Figure 1, with the additional showing of wrappings or windings of tire material which is applied to and around the tire body and bead elements.

Figure 3 is a view similar to Figure 2, but illustrating the tire bead elements or members and the textile cord wrappings or windings, together with the sheet of further tire body material, all shown in Figure 2, after the same have been subjected to pressure or consolidated together, there being further shown a second sheet or strip of tire body material consolidated with the members or elements just recited, and applied over the uppermost course or layer of textile strand wrappings, or windings, and between the tire bead elements or members;

Figure 4 is a fragmentary face or plan view of the completed tire material shown in Figure 3, the same being sectioned and broken away to clearly disclose the lower formation of the wrappings or windings;

Figure 5 is a cross section of a core upon which tires are to be formed, there being shown upon the same successive layers or courses of the tire and bead fabric shown in Figures 3 and 4, the bead structure being in process of rolling down or pressing or consolidating;

Figure 6 is a fragmentary view similar to Figure 5, showing the formation in the bead-forming pocket of a bead structure for a straight side tire;

Figure 7 is a fragmentary view of a portion of the structure shown in Figure 6, including the completed bead structure, the jacket or envelope or cover strip having been given its final fold and having been rolled down into its final position to entirely enclose the completed bead structure: and, Figure 8 is a view similar to Figure 6 showing the bead structure of a straight side tire undergoing formation by pressing or rolling down or consolidating. In this view, likewise, metallic strands of bead material are substituted for the textile strands shown in Figure 5, the strands shown in Figures 6 and 7 being likewise preferably metallic in multiple formation.

Fig. 9 is a fragmentary view of a tire carcass with portions of the tire body broken away to show the bead material. In Figures 1 to 4 inclusive, the bead members or elements are shown in a conventional way as strands which may be either metallic or textile or of any other suitable material.

Referring to Figs. 1 to 7, inclusive, A designates a bead element or member, and in Figure 8 B designates a bead element or member, both being associated with tire body material C, which in Figures 5, 6, 7 and 8 is only conventionally shown as material wrapped or wound about the bead elements A and B. Such generally designated tire body material C comprises a length or strip of rubber or rubberized material 9, wrappings or windings of textile cords or strands 10 which are produced, developed or applied around or about the tire bead elements A, and a further strip or sheet of tire body material 11, such as rubber or rubberized materials, if desired. The completed tire forming material is shown in Figures 3 and 4, and it may be produced in any desirable or preferable manner, as by the use of a machine such as that disclosed in the above-identified co-pending application. In accordance with general practice, a platen 12 may be employed, the same having curved or channeled side flanges 12ᵃ along which the bead elements A may be suitably fed, and the first sheet 9 of tire body material may be fed over said platen by and conveyed upon a spacer sheet 12ᵇ of muslin or the like which in any suitable manner is first advanced with and under the sheet or strip 9 and then reversed in its course and suitably taken up, passing above the upper surface of the platen 12. While the sheet or strip 9 is thus passing above the platen and the bead elements A are passing along the sides of the platen, the cords or strands 10 of textile or other material are wound or wrapped about the bead elements A and around the entire group of parts or features shown in Figure 1, so that there is suitably drawn off from the platen the bead elements A, the first tire body sheet or strip 9, and the windings or wrappings 10 which assume a helical formation flattened along its axis. This partially completed material is then suitably consolidated or compressed, together with the second tire body sheet or strip 11, into the formation and organization shown in Figure 3, with the bead elements A and the wrappings thereon projecting above the plane of the remaining portion of the completed fabric. This result may be produced by the use of suitable grooved or channeled rolls. The completed material shown in Figures 3 and 4 is then ready for incorporation in or development into a tire carcass having suitable bead structures at its opposite sides.

Giving attention now particularly to the tire and bead structures coming within the scope and partaking of the substance of the invention, Figures 5, 6, 7 and 8 disclose the same in different forms, the body portion C of the tire, namely, the body portion or portions between the bead elements A or B being merely conventionally or diagrammatically shown without a showing of the details, which may be such as those disclosed in Figures 1 to 4, inclusive. These tire body portions C and bead elements A or B, with other adjuncts, about to be described, are shown in Figures 5, 6 and 7 in process of being organized or formed into tires, in connection with core devices D, such core devices being provided with bead rings d, of which the bead ring shown in Figure 5 is slightly upwardly arched or curved for use in forming beads for clincher tires, while the bead ring shown in Figures 6 and 8 have plane upper surfaces for use in forming the beads of straight side tires. In Figure 5 is shown a presser roller 13 for forming and consolidating the bead structure, the same being channeled or concave in its periphery, as at 13$^a$, and designed to act upon the bead elements to produce a bead structure for clincher or clincher tires. The overlying courses of bead elements A are pressed down and consolidated in the pocket formed between the bead ring $d$ and the side of the core D. Prior to the application of the tire forming material to the core D, a jacket or envelope or cover strip $e$, for the bead to be produced in the respective pocket, is applied by hand or otherwise, within the concavity of such pocket between the bead ring and the core proper, so as to leave one side of the strip pendent, until all of the overlying courses of the bead elements A have been pressed and consolidated within the pocket by the presser member or roller 13. Thereupon the presser roller is withdrawn from contact with the bead structure, and the pendent portion of the envelope or cover strip $e$ is brought up over and outside of the last course of bead element, and the roller 13 again brought into contact therewith to thoroughly apply the same to the outside bead element course and consolidate it therewith, in completion of the bead structure.

It will be understood that the operation indicated in Figures 5, 6 and 8 as concerned with the formation of a bead at one side of the tire is duplicated in connection with the core and a bead ring $d$ at the other side of the tire.

In Figure 6 is indicated the process of formation of a straight side tire in which the periphery 14$^a$ of the roller or presser member 14 is convex, and the bead structure is flattened out in a pocket to produce a straight side formation. Similarly, a bead jacket or envelope or cover strip $e$ is utilized, in producing this form of bead structure, the same being applied in the pocket and finally united with the bead element and outer course and incorporated in the final bead structure in the manner last described.

Referring to Figure 7, the finished bead structure, and fragments of the tire body portion C, which are shown in Figure 6, are shown as removed from the core and the bead ring, the bead envelope or jacket or cover strip $e$ being shown as finally applied to and consolidated with the remaining portions of the bead structure.

In Figure 8 the bead structure is shown in process of formation in the core pocket, and within the folds of the bead jacket or envelope or cover strip $e$, and a filler material $f$ is shown at first applied within the pocket, that is, after the jacket or envelope or cover strip $e$ is folded into the pocket. This filler material may be textile or metallic, such as tape which is supplied as auxiliary bead material, in the operation of a machine such as that disclosed in the co-pending application above identified, or may be otherwise supplied to the core. This filler material is disposed within the innermost portion of the bead jacket or envelope, and then the courses or layers of tire and bead material are applied to the core, alternating with interlocking tapes or strips $g$, which may likewise be fed to the core from a suitable machine, in the form of auxiliary bead material, or may be otherwise suitably and expediently supplied. One of such interlocking strips, which may consist of tape and be of the same material as the filler material $f$, is applied next to the filler material, and a final interlocking strip is applied over the outermost course or layer of the bead material. These interlocking strips $g$ serve to impart inherent stability to the bead structure, and to generally strengthen and reinforce the same and prevent disassociation of its several component parts, or courses of bead material. In the form of the construction shown in Figure 8 are disclosed metallic strands or cables $h$ which are incorporated into the tire and bead fabric in any suitable manner, as in the normal operation of a machine as above referred to, such strands or cables taking the place of the textile cords or strands indicated in the bead element showings in Figures 5, 6 and 7, the bead element showing in Figures 1 to 4 at A being, as above mentioned, merely conventional and not indicated to designate any particular or specific material. It will be understood that in none of the Figures 1 to 8 is it intended to limit the structures therein shown to any specific composition or constitution of bead element, whether textile, metallic or of other nature, the material to be selected and employed being open to selection in accordance with the expediencies or requirements of the particular surface under consideration.

The bead structure constituent as described and shown in Figure 8 is rolled down by a roll 15 having a concave portion 15$^a$ which operates at the zone of the cables or strands $h$, and a convex portion 15$^b$ which operates at the portions of the bead structure just above such strands or cables. The slight rib remaining upon the side of the bead structure after its formation, is pressed flat or reduced by the side plates used in connection with the vulcanizing mold. After the bead structure has been completed to the stage shown in Figure 8, the jacket or cover strip or envelope strip e, at its pendent portion, is brought up about the remaining parts of the bead structure at the outside and rolled down upon the same, completely jacketing the bead structure.

A radical departure from previous practice will be noted with respect to the present invention, among other things, in that the tire bead structure is built up of a plurality of overlying or superposed parts or elements, produced by applying course or layer after course or layer of the tire and bead fabric, so that each bead structure is composite of a plurality of separate bead portions, the units of which group of bead portions are thereupon formed or pressed or consolidated together to produce the ultimate and final bead structure. In other words, the present invention paves the way for building up and developing a bead structure turn by turn or layer by layer or course by course, in continuous operation, and at the same time rolling down and consolidating such tire structure in its development, and this is performed coincidently with the formation of the tire body itself, comprising the tire body portion C, so that a progressive development and production of the tire with its bead structure can be carried on as a continuing operation, and the bead structure may be rolled down and consolidated at the same time that the tire structure itself is rolled down and formed. Likewise, a superior strength and durability and degree of stress resistance is imparted to the tire and bead structure, in that the fabric of the tire structure is wrapped or wound about the bead material, and this produces a plurality of courses or layers of tire and bead material, as the development of the tire and bead progresses, each course of tire material being intimately associated and positively connected with its course of bead material at each side. Thus a permanent and durable tire and bead structure is produced in which the most permanent relation between the bead and tire body elements is maintained in opposition to any disturbing stresses. It is believed to be novel with this invention to provide the tire body with side bead material, about or around which the material constituting the tire body, is wrapped or wound, so as to firmly and permanently and intimately bind and associate such bead material with such tire body material. The fact that tire material has heretofore been produced in which side cords or strands have been employed, and about which the tire material has been wrapped or wound, is not pertinent to the present invention, because in no such case known to me have such side cords or strands ever been used or intended to be used for incorporation in bead structures, but have only been used as temporary means for preventing endwise stretch of the material, and have ordinarily been severed and removed from the material prior to its use in tire building.

It will be obvious that many modifications in the make-up and organization of the fabric for tires and tire beads, such as disclosed in the drawings, may well be made, in practicing the invention, as by variation of the nature of the tire body strips 9 and 11, of the wrappings or windings 10, and of the bead elements A; and also that it is optional, within limits of convenience and efficiency, how such tire and bead material shall be produced, and its various parts or elements fabricated and brought into final usable form. Likewise, it is obvious that any suitable and expedient means or accessory or adjunct may be employed in an operation or process or performance of working up such tire material into tire carcasses, only one such method of performance being indicated in the drawings, as in Figures 5 to 7 inclusive, namely, by the use of a core and bead ring, together with presser members or rollers as 13, 14 and 15, for forming and consolidating the bead structures. It is further obvious that different types and forms of bead structures and tires may be evolved from the tire and bead material disclosed in the drawings and heretofore described, and that many variations thereof may be utilized in the construction and formation and organization of such varying types and characters of tires. All of these things will fall within the true limits and boundaries of the invention, and will readily adjust themselves to those skilled in the art and practicing such invention.

I do not desire that the invention be limited to details of disclosure herein and of the drawing, other than as required by a fair and proper interpretation of the claims.

Having thus disclosed my invention, I claim and desire to secure by Letters Patent:

1. A tire carcass comprising a body portion and bead cores arranged at either side of and connected to said body portion, each core being formed from a continuous section of bead material and extending a plurality of times around the adjacent side of the tire carcass with their convolutions disposed side by side in a plane substantially at right angles to the plane of the tire carcass.

2. A tire carcass formed from a convolutely wound composite web having beads along its opposite edges, each said bead comprising strands and a filler material associated with the strands and the body portion of the web comprising layers of rubber and cords helically disposed and wrapped around said strands.

3. A tire carcass comprising beads at either side of the carcass each consisting of a continuous length of bead material coiled or wound into a plurality of turns, a continuous length of body material disposed between the beads and wound into a plurality of turns, means for connecting the turns of bead material and body material together, and a cover for enclosing the turns of bead material at each side of the tire carcass.

4. A tire carcass formed from a continuous single section of composite material convolutely wound to provide a plurality of superposed layers, said section of material throughout its entire length comprising a body portion of rubber material, bead elements disposed along its opposite edges and continuous cords helically disposed and embedded in the rubber and extending around the beads to connect them to the opposite edges of the rubber material throughout its length.

5. A tire carcass formed from a continuous web of composite material having contiguous beads along its opposite edges wound convolutely and interlocking strips between adjacent turns of the beads.

6. A tire carcass formed from a continuous web of composite material having contiguous beads along its opposite edges wound convolutely and interlocking strips between adjacent turns of the beads, said strips extending from the beads upwardly toward the tread portion of the carcass.

7. A tire carcass formed from a continuous web of composite material having contiguous beads along its opposite edges wound convolutely and interlocking strips between adjacent turns of the beads, and a cover for enclosing the turns of each bead and the interlocking strips between them.

8. A tire carcass formed from a single length of a convolutely wound composite web comprising alternate layers of sheet rubber and helically disposed continuous cords with bead cores extending along the opposite edges of one of the rubber sheets, the cords enveloping the cores to connect them to the edge of the last mentioned rubber sheet throughout the length thereof.

9. A tire carcass including side bead cores each formed from sections of compressible material and strands and a body material comprising strands in continuous formation wrapped around the bead cores in progressive helical arrangement and subsequently flattened, the bead cores being shaped in the final formation of the tire carcass into beads.

10. A tire including a series of similar superposed elements, each of which includes side bead cores of compressible material, and a body material comprising cords wrapped around the bead cores in progressive helical formation and subsequently flattened in layers of oppositely inclined transversely extending cords, the tread of the tire including the cord layers of the several elements and the beads of the tire including the several bead cores which are flattened and shaped in the formation of the beads.

11. A tire comprising a convolutely wound composite web having bead cores and a body material consisting of a sheet of rubber and strands wrapped around the bead cores in progressive helical formation and embedded in the rubber sheet to form superposed layers of rubber and strands, and a cover for enclosing the turns of bead material at each side of the tire.

12. A tire, comprising tire body material and tire bead material at the side edges thereof, said tire body material and said tire bead material being provided in superficial contact, and interlocking members between the courses of said tire bead material; said interlocking members consisting of continuous strips of flexible material in courses alternating with the courses of tire bead material.

13. A tire, comprising tire body material and tire bead material, a bead cover strip for enveloping the bead, and bead filler material introduced within the cover strip and between the cover strip and the main bead material.

14. A tire, comprising tire body material and tire bead material, a bead cover strip for enveloping the bead, and bead filler material introduced within the cover strip and between the cover strip and the main bead material; said bead cover strip being adapted to be sealed over the finished bead structure.

In testimony whereof, I have signed my name to this specification in the presence of two subscribing witnesses.

HOWARD I. MORRIS.

Witnesses:
RAYMOND IVES BLAKESLEE,
J. SHUTT.